July 15, 1969   J. M. KAPLAN   3,455,281
QUICK-RELEASE ANIMAL RESTRAINING DEVICE
Filed Aug. 21, 1967
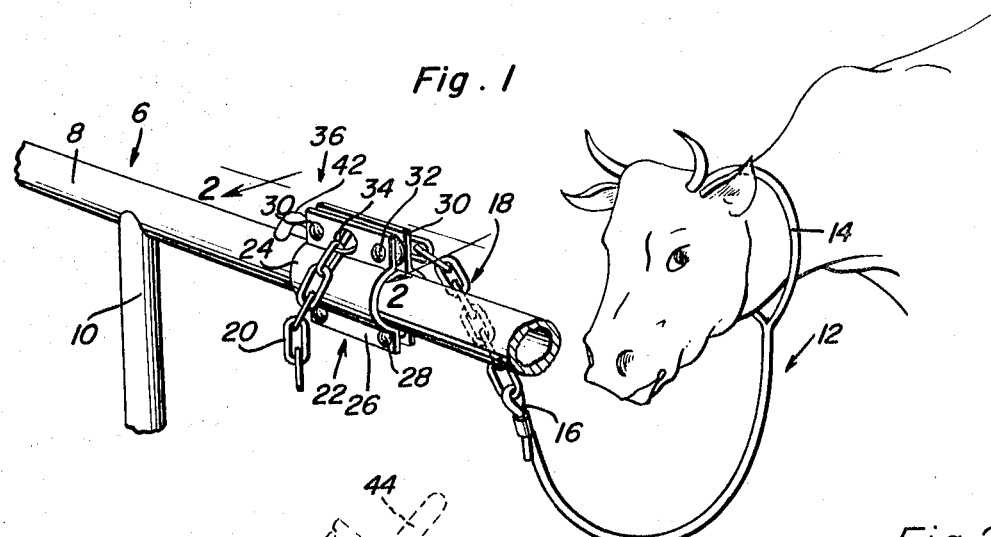
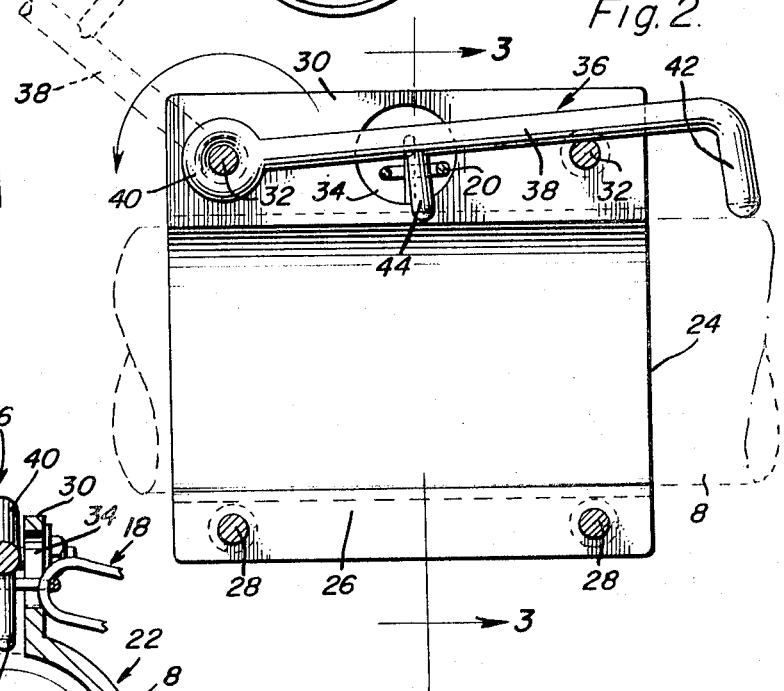
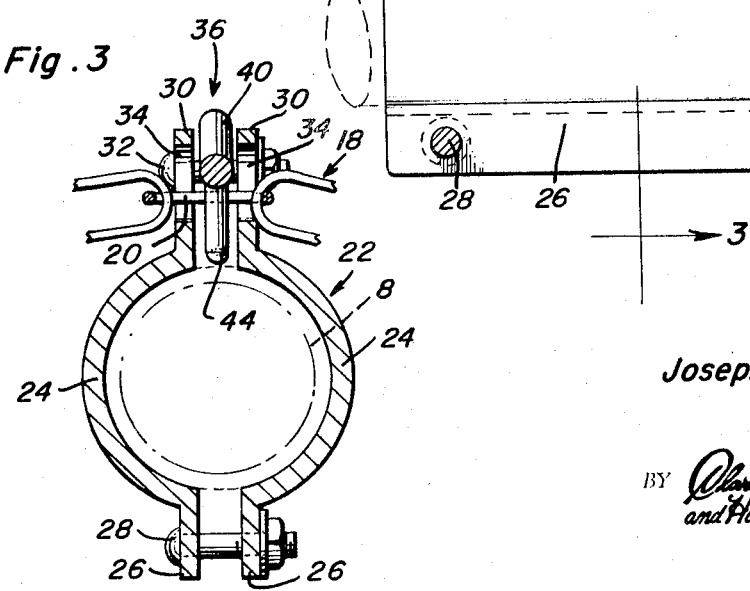
Joseph M. Kaplan
INVENTOR.

United States Patent Office 3,455,281
Patented July 15, 1969

3,455,281
QUICK-RELEASE ANIMAL RESTRAINING DEVICE
Joseph M. Kaplan, Millerton, N.Y., assignor of forty-five percent to Sanford Kaplan, Millerton, N.Y.
Continuation-in-part of application Ser. No. 640,089, May 22, 1967. This application Aug. 21, 1967, Ser. No. 663,927
Int. Cl. A01k 1/04, 1/06; B68b 5/08
U.S. Cl. 119—110                                8 Claims

ABSTRACT OF THE DISCLOSURE

The tether has a free end equipped with a chain-like portion removably threaded through keeper holes in flanges carried by symmetrical clamping bracket sections. These sections are bolted on a hitching or "tying" rail. A latching lever is pivoted between the flanges and has a depending lug providing a detent which is releasably received through a selected link on the chain-like portion. In case of fire or panic, "flip" the latch up and allow the animal to pull instinctively and free itself.

---

This is a continuation-in-part of application Ser. No. 640,089, filed May 22, 1967, and now abandoned, and relates to novel and improved means whereby animal hitching means, a chain-equipped tether for example, can be safely but releasably anchored on a hitching rail of a type commonly used in cow milking parlors, horse stabling stalls and the like, and has to do, more particularly, with quick releasable means for the free anchorable end of the chain.

It is common practice, in a cow barn for example, to tie the free end of a thong or tether to a post-supported hitching rail extending across the head end of a stall. Then, too, various devices have been offered to release the tying means in case of fire or an emergency. The patent to Taylor, 1,071,824, shows a halter with a rope co-operating with a rail having a keeper hole and releasable latching means. The animal releaser shown in the patent to Larson, 1,297,872, is another but nonanalogous example. Remote controlled stanchions are also being used. The objective in the instant matter is to structurally and functionally improve on known prior art animal releasers and, in so doing, to provide a simple, practical and easy-to-use tether holder and releaser which will cope with the fire hazard problem with certainty and efficiency.

Briefly, the present invention has to do with animal tying or hitching means characterized by a leather or similar flexible tether having a flexible neck encircling loop, or other appropriate animal engaging means, at one end and a chain-like portion at the other end, and a stationary guard rail having a tether fastening and animal restraining means embodying a bracket and pivotally mounted latch. The latch has a detent which is releasably connectible with a selected link of said chain-like portion in a manner to releasably hitch the chain-like portion to said rail, and a downturned end which precludes an accidental release of the latch by the animal.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a fragmentary portion of a guard-type structure which is herein designated as a hitching rail and which in practice is located at the head end of a cow or equivalent animal stall and showing, more particularly, the quick release animal restraining and releasing device constructed in accordance with the invention and in use, FIG. 2 is an enlarged detail view with the rail in phantom lines and taken on the plane of the section line 2—2 of FIG. 1, FIG. 3 is a section at right angles on the vertical section line 3—3 of FIG. 2, and FIG. 4 is an elevational view of a slightly modified form of latch bar.

With reference again to FIG. 1 the guard means, also sometimes referred to as a barrier, is denoted generally by the numeral 6. It is characterized by a horizontal pipe or tube here designated as a hitching rail 8 and which is supported at the desired height by stationary support posts or uprights 10. At this point it should be stated that the invention, that is the quick release device, is designed and adapted to tie and hold animals in a given stall. It will simplify the description here to think of the animal as being a horse or a cow. A cow is shown in FIG. 1 and will suffice to enable the reader to ascertain and determine the nature of the invention.

To the ends desired, a leather or an equivalent thong is constructed to provide a tether 12 which has a neck encircling loop or noose 14, or other animal engaging means, at one end. The free forward end is provided with a chain or chain-like portion 18, preferably by means of a terminal eye or the like 16 to which the accompanying chain 18 is connected. It has been found that this type of a tether functions quite efficiently and satisfactorily. In carrying out the principles of the invention, the idea is to detachably and adjustably fasten a selected one of the links or link-like loops 20 of the chain to the rail 8. While it would be within the purview of the invention to pass the chain through openings in the rail and provide latch means to serve the end result desired, it has been found to be quite practical to employ a two-part or sectional clamp-type bracket such as is denoted generally at 22. As better shown in FIG. 3 this clamp comprises a pair of duplicate companion sections each of which embodies a generally semicircular portion 24 which is conformingly fitted against and in contact with the hitching rail 8. These sections are provided at their lower ends with a pair of spaced parallel longitudinal flanges 26 assembled and maintained in usable position by simple bolts and nuts denoted generally at 28. These flanges may be regarded as the lower flanges. The complemental upper spaced parallel flanges are denoted at 30 and they too are assembled and maintained in laterally spaced rail clamping position by nut-equipped bolts 32, preferably spacer bolts to maintain a fixed spacing between the flanges 30. It will be noted that the flanges 30 are provided with aligned openings 34 which constitute keeper holes and which are such in size that they permit the links 20 of the chain 18 to be inserted and threaded therethrough in a manner clear, it is believed, from the views of the drawing.

The releasable latching means comprises a pivoted gravity lowerable latch which is denoted generally by the numeral 36 and which as shown in FIG. 2 comprises a simple rod member or body which constitutes a lever 38 and which has a suitable eye 40 at one end pivotally mounted on one coacting bolt 32 between the upper flanges 30. This latch or lever is of a length that the free end portion, when in use, extends beyond the flanges to facilitate catching hold of the same, this free end portion being subsequently downturned, as at 42, to extend closely to and normally engage rail 8. This extension of the downturned portion 42 to the rail 8 is of particular significance in that it prevents any possibility of the latch being accidentally released by the animal either pushing its nose under the free end of the latch, or a portion of the tether engaging thereunder in a manner so as to shift the latch upward to its released position. As noted in FIG. 2, the lever 38 can rest on the right hand bolt 32. The actual latching is achieved by simply providing an intermediate portion of the lever or latch 38 with a lateral integral lug which constitutes a detent 44 and which is releasably engageable with one of the chain links in the manner shown.

At this point attention is directed to FIG. 4 wherein a latch 46, slightly modified in form from the latch 36, has been illustrated. This latch 46 is formed from a single bar of metal, preferably cold rolled steel ¼″ thick, rather than the rod-like construction of the latch 36. The eye 48 on the first end of the latch 46 is defined by the provision of an aperture 50 through a depending end portion 52. A similar depending end portion 54 is provided at the other end of the latch 46 so as to function in the manner of a rail contacting guard against accidental dislocation of the latch by either the tether means or the animal itself moving under the free end portion of the latch 46. Finally, the detent 56 is provided by a third integral depending portion located at an appropriate intermediate point between the depending portions 52 and 54, the detent 56 of course functioning in the same manner as the detent 44. Incidently, it should also be appreciated that, as a simplified form of the latch of the instant invention, the depending free end portion, either 42 or 54, can be eliminated should the problem of an accidental release of the latch not be an important factor because of particular considerations.

Referring again to FIGS. 1–3, it is evident that when the user desires to bring the chain-equipped tether into play it is only necessary to swing the latch or lever 36 to an out-of-the-way position as shown in phantom lines in FIG. 2. The links of the chain are then passed or threaded through the keeper holes and the latching lever is swung back from left to right to assume the position shown, particularly in FIGS. 2 and 3. Manifestly when the latch or lever is in this position the tethering chain is anchored to the clamp bracket. In case of an emergency or fire the barn attendant moves swiftly along the aisle and flips the latching levers from right to left as indicated by the arrow in FIG. 2 thus releasing the chain. The animal instinctively pulls on the tether and chain when in a state of panic and when thus freed can make a reasonably safe effort to escape from the barn or other enclosure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a structure of the class described, animal tying flexible tether means having animal engaging means at one end thereof and at least one link-like loop at the other end, a stationary member having positioning and fastening means for the tether means embodying a pivotally mounted latch, said latch having a detent which is releasably engageable within said loop in a manner to releasably hitch the tether means to said member, said stationary member comprising a generally horizontal rail, said positioning and fastening means also embodying a clamp bracket, said bracket comprising a pair of companion sections clampingly embracing and removably mounted on said rail, said sections being provided with a first pair of spaced upwardly projecting parallel flanges, and said latch comprising a manually trippable lever having one end pivotally mounted between said flanges, said detent comprising a lateral lug fixed on an intermediate portion of said lever, said lever being lowerable in a manner to vertically introduce the lug into said link-like loop.

2. The structure according to claim 1, and wherein said lever assumes a generally horizontal position nested between said flanges when in use, the free end of said lever being swingable in a vertical arcuate path when it is intentionally manually swung from a latched to an unlatched position, the intermediate portions of said flanges having registering keeper holes of a size to allow the link-like loop of said tether to pass slidingly through at least one of said keeper holes, whereby it is caused to bridge the space between said flanges and is in a set position capable of allowing said detent to be retentively but releasably engaged therewithin.

3. The structure according to claim 2, and wherein the second end of said lever opposite the pivoted end is caused to project to a ready-to-release position beyond adjacent end portions of said flanges, whereby it is readily accessible so that said lever can be readily unlatched by flipping the lever up and swinging it to a completely unlatched position.

4. The structure according to claim 3 wherein the second end of said lever is downturned and, in the latched position of said lever, extending to a position closely adjacent the underlying rail.

5. In a structure of the class described, animal tying flexible tether means having animal engaging means at one end thereof and at least one link-like loop at the other end, a stationary member having positioning and fastening means for the tether means embodying a pivotally mounted latch, said latch having a detent which is releasably engageable within said loop in a manner to releasably hitch the tether means to said member, said positioning and fastening means for the tether means comprising a pair of elongated laterally spaced vertical flanges fixed to the upper portion of said member, at least one of said flanges having a lateral opening therethrough for the reception of the link-like loop inwardly therethrough into position between said flanges, said latch being pivotally mounted to said flanges to one side of said loop passing opening for swinging movement in a vertical plane between said flanges, said latch detent being so positioned as to engage within the link-like loop when the loop is positioned across the space between the flanges through the opening and the latch is swung downwardly relative to the flanges.

6. The structure according to claim 5 wherein said lateral opening consists of a hole defined through said one flange.

7. The structure according to claim 6 wherein the second of said flanges is provided with a hole therethrough in alignment with the first-mentioned flange hole, said other end of the tether means being in the nature of a series of interconnected link-like loops longitudinally introducible through said flange holes for the positioning of a selected one of said loops between said flanges for reception of the latch detent therein.

8. The structure according to claim 7 wherein the end of said latch remote from the pivotally engaged portion of said latch projects beyond said flanges and terminates in a downwardly directed portion of a height so as to engage the underlying stationary member when said latch is in its downward latched position.

References Cited

UNITED STATES PATENTS

| 1,059,084 | 4/1913 | Starkey | 119—114 |
| 1,415,117 | 5/1922 | Rassmann | 119—147 |
| 1,449,954 | 3/1923 | Radoush | 119—110 X |
| 1,817,415 | 8/1931 | Liginski | 119—112 |
| 3,064,623 | 11/1962 | Riggs | 119—114 X |
| 3,292,226 | 12/1966 | Foster | 119—114 X |

FOREIGN PATENTS

| 423,009 | 12/1925 | Germany. |

ALDRICH F. MEDBERY, Primary Examiner

U.S. Cl. X.R.

54—69